US008532499B2

(12) United States Patent
Caton et al.

(10) Patent No.: US 8,532,499 B2
(45) Date of Patent: Sep. 10, 2013

(54) OPTICAL TRANSMITTER WITH ADAPTIVELY CONTROLLED OPTICALLY LINEARIZED MODULATOR

(75) Inventors: John W. Caton, Doylestown, PA (US); Joseph Hober, Southampton, PA (US); John Klima, Perkasie, PA (US); Gustav Witzel, Warminster, PA (US)

(73) Assignee: Emcore Corporation, Albuquerque, NM (US)

( * ) Notice: Subject to any disclaimer, the term of this patent is extended or adjusted under 35 U.S.C. 154(b) by 409 days.

(21) Appl. No.: 12/428,935

(22) Filed: Apr. 23, 2009

(65) Prior Publication Data

US 2009/0232518 A1 Sep. 17, 2009

Related U.S. Application Data

(63) Continuation-in-part of application No. 11/258,732, filed on Oct. 25, 2005, now abandoned.

(51) Int. Cl.
*H04B 10/00* (2013.01)
*G02F 1/07* (2006.01)

(52) U.S. Cl.
USPC .......................... 398/198; 398/159; 359/245

(58) Field of Classification Search
USPC ........................................................ 398/198
See application file for complete search history.

(56) References Cited

U.S. PATENT DOCUMENTS

| 5,003,624 A | 3/1991 | Terbrack et al. |
| 5,148,503 A | 9/1992 | Skeie |
| 5,247,243 A | 9/1993 | Hall et al. |
| 5,249,243 A | 9/1993 | Skeie |
| 5,278,923 A | 1/1994 | Nazarathy et al. |
| 5,321,543 A | 6/1994 | Huber |
| 5,526,164 A * | 6/1996 | Link et al. ...................... 398/195 |
| 5,850,305 A | 12/1998 | Pidgeon |
| 5,900,621 A | 5/1999 | Nagakubo et al. |
| 6,046,838 A * | 4/2000 | Kou et al. ...................... 359/245 |
| 6,133,790 A | 10/2000 | Zhou |
| 6,148,503 A | 11/2000 | Delnick et al. |
| 6,163,395 A * | 12/2000 | Nemecek et al. ............. 398/198 |
| 6,204,951 B1 | 3/2001 | Coward et al. |
| 6,239,897 B1 | 5/2001 | Jackson |
| 6,282,003 B1 | 8/2001 | Logan, Jr. et al. |
| 6,317,247 B1 | 11/2001 | Yang et al. |
| 6,392,779 B1 * | 5/2002 | Iannelli et al. ................ 359/245 |

(Continued)

*Primary Examiner* — Ken Vanderpuye
*Assistant Examiner* — Amritbir Sandhu (57) ABSTRACT

An optical transmitter for generating a modulated optical signal to be transmitted over fiber optical link. The transmitter includes: an optical source for producing an optical signal; an optically linearized modulator (OLM) as external modulator for modulating the optical signal produced by the optical source with an information carrying signal. The external modulator includes a first input port for receiving a first DC bias signal, and a second input port for receiving a second DC bias signal. The optical transmitter further includes a pilot tone generator for generating a first pilot signal to be applied to the first input port and a second pilot signal to be applied to the second input port. The first and second pilot signals are capable of producing distortion products in the modulated optical signal. A differential modulation signal is imposed onto either the first pilot signal or the second pilot signal so as to generate a first control signal that alternately adjusts the first DC bias signal and the second DC bias signal in order to minimize the distortion products. The optical transmitter may include a digital based control system that is adapted to reduce composite even and odd order distortions in the OLM.

21 Claims, 6 Drawing Sheets

(56) References Cited

U.S. PATENT DOCUMENTS

| | | | |
|---|---|---|---|
| 6,426,822 B1 * | 7/2002 | Winter et al. | 398/192 |
| 6,449,080 B1 | 9/2002 | McBrien et al. | |
| 6,479,979 B1 | 11/2002 | Kingsley et al. | |
| 6,483,953 B1 | 11/2002 | McBrien et al. | |
| 6,490,071 B2 | 12/2002 | Logan, Jr. et al. | |
| 6,510,255 B2 | 1/2003 | Masuda et al. | |
| 6,570,698 B2 * | 5/2003 | Kim et al. | 359/239 |
| 6,580,544 B1 | 6/2003 | Lin et al. | |
| 6,687,451 B1 | 2/2004 | Sikora | |
| 6,687,466 B1 * | 2/2004 | Chiappetta | 398/193 |
| 6,700,907 B2 | 3/2004 | Schneider et al. | |
| 6,842,587 B1 | 1/2005 | McGhan et al. | |
| 6,879,422 B2 | 4/2005 | Notargiacomo et al. | |
| 6,895,185 B1 | 5/2005 | Chung et al. | |
| 6,917,455 B2 | 7/2005 | McBrien et al. | |
| 6,941,077 B2 | 9/2005 | Aronson et al. | |
| 6,961,166 B2 | 11/2005 | Wooten et al. | |
| 7,075,695 B2 | 7/2006 | Gronbach | |
| 7,092,643 B2 * | 8/2006 | Kajiya et al. | 398/198 |
| 7,155,071 B2 | 12/2006 | Stook et al. | |
| 7,200,343 B2 * | 4/2007 | Ikeuchi | 398/198 |
| 7,324,760 B2 * | 1/2008 | Gronbach et al. | 398/183 |
| 7,346,279 B1 * | 3/2008 | Li et al. | 398/32 |
| 7,382,943 B1 * | 6/2008 | Heaton | 385/3 |
| 7,463,802 B2 | 12/2008 | Witzel | |
| 7,532,824 B2 * | 5/2009 | Ikeuchi | 398/198 |
| 7,561,810 B2 * | 7/2009 | Noguchi et al. | 398/198 |
| 7,706,696 B2 * | 4/2010 | Gronbach | 398/198 |
| 7,715,732 B2 | 5/2010 | Koh et al. | |
| 7,729,621 B2 * | 6/2010 | Nahapetian et al. | 398/198 |
| 7,853,155 B2 * | 12/2010 | Krieg | 398/198 |
| 7,916,377 B2 | 3/2011 | Witzens et al. | |
| 2002/0003641 A1 * | 1/2002 | Hall et al. | 359/122 |
| 2002/0075550 A1 * | 6/2002 | Olesen | 359/245 |
| 2004/0161249 A1 * | 8/2004 | Suda et al. | 398/198 |
| 2006/0034616 A1 * | 2/2006 | Tipper | 398/186 |
| 2006/0127103 A1 | 6/2006 | Mazurczyk et al. | |
| 2006/0210210 A1 | 9/2006 | Webb et al. | |
| 2006/0251425 A1 | 11/2006 | Kupershmidt et al. | |
| 2007/0019968 A1 | 1/2007 | Hashimoto et al. | |
| 2007/0047969 A1 * | 3/2007 | Nakashima et al. | 398/198 |
| 2007/0092262 A1 * | 4/2007 | Bozarth et al. | 398/159 |
| 2007/0134006 A1 * | 6/2007 | Krieg | 398/198 |
| 2007/0165294 A1 * | 7/2007 | Witzel | 359/245 |
| 2008/0075470 A1 * | 3/2008 | Ohira et al. | 398/183 |
| 2008/0145063 A1 * | 6/2008 | Li et al. | 398/140 |
| 2008/0219678 A1 * | 9/2008 | Doi | 398/198 |

* cited by examiner

OPTICAL TRANSMITTER WITH ADAPTIVELY CONTROLLED OPTICALLY LINEARIZED MODULATOR

CROSS-REFERENCE TO RELATED APPLICATION

U.S. application Ser. No. 11/258,732 filed on Oct. 25, 2005 is incorporated herein by reference.

FIELD OF THE INVENTION

The present invention relates generally to optical transmitters for optical fiber communication systems and more specifically to an optical transmitter for externally-modulated lasers comprising an optically linearized modulator.

BACKGROUND

External modulators are commonly used in analog fiber optic communication systems, such as CATV signal distribution, to modulate in amplitude an optical carrier with an information signal. The advantages of using external modulation in analog fiber optic systems include excellent performance stability, flexible system adaptability, and minimization of residual FM chirp while reducing fiber-induced dispersion effects.

Figure 1:
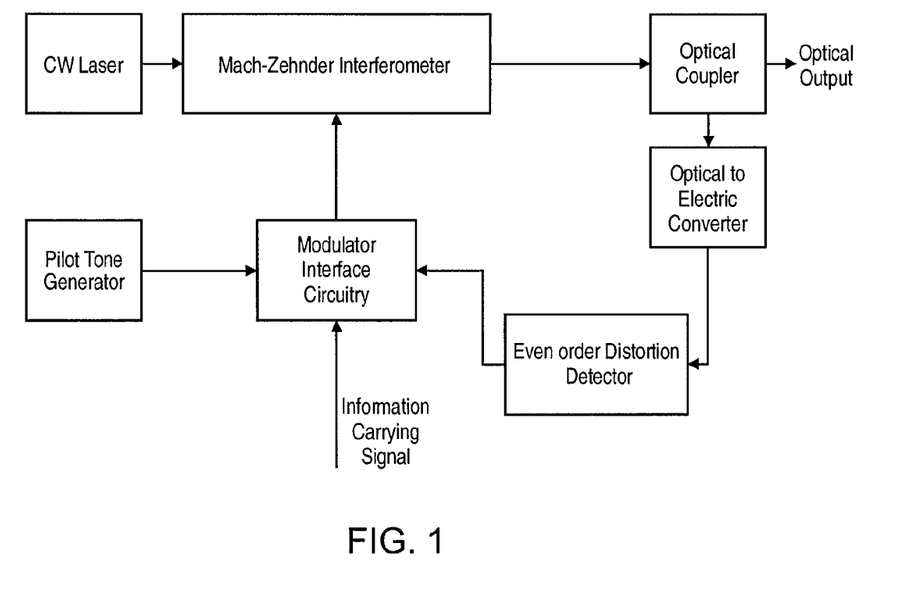
FIG. 1 is a simplified block diagram of a control system suitable to minimize even order distortions in an externally modulated optical transmission device utilizing a Mach-Zehnder Interferometer (MZI).

Adaptive control of transmission systems employing single stage MZI external modulators has received much attention in the last years. FIG. 1 illustrates a typical control system including a high power continuous-wave (CW) laser connected to an external optical modulator, which is a Mach-Zehnder interferometer (MZI) whose output is connected to an optical coupler so that a sample of the optical output signal can be used for closed loop distortion cancellation.

Figure 2:
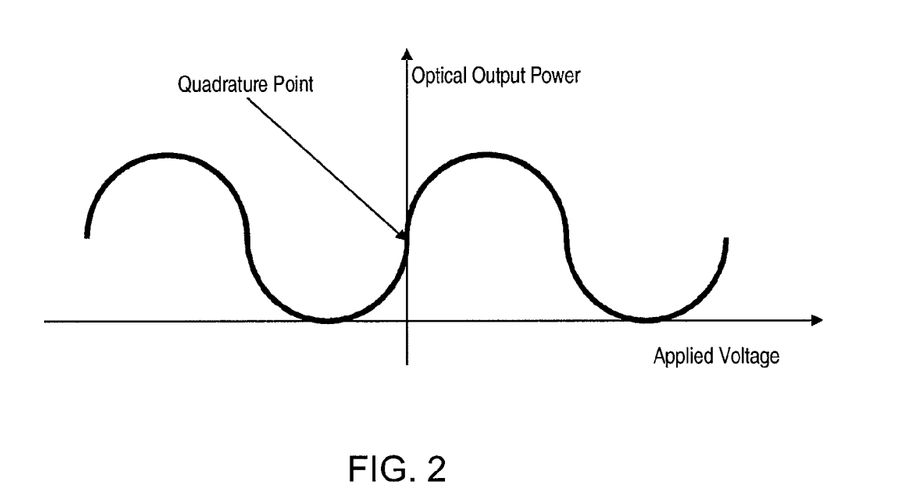
FIG. 2 is a diagram that shows a generic transfer function of a single-stage MZI.

Typical MZI modulators include an electrical input port for application of the desired information carrying signals that are to be transmitted along with a DC bias port used to apply an appropriate DC bias voltage in order to maintain the modulator's operating point at quadrature. The transfer function of a Mach-Zehnder modulator is typically a raised cosine function, a portion of which is shown in FIG. 2, where the quadrature point is indicated.

Maintaining the modulator at quadrature is very important for the reduction of even order distortion of the information carrier. Furthermore, MZI optical modulators fabricated in lithium niobate ($LiNbO_3$) have been shown to be sensitive to thermal and mechanical stresses that cause dynamic shifts of the quadrature bias point. The variations induced by stresses require active control to maintain an optimum distortion performance. Assuming that a proper bias control is possible, odd order distortion generation becomes dominant in systems employing these electro-optic devices.

Odd order distortion performance improvement has been traditionally achieved using electrical pre-distortion techniques, as proposed in U.S. Pat. No. 5,161,044. The described technique employs non-linear circuits elements to create odd order distortion products of the information signal, which are equal in amplitude and opposite in phase with the products generated by non linear transfer function of a Mach-Zehnder modulator. It has been shown that the amount of odd order cancellation obtainable using this technique is dependent on the accuracy of the pre-distortion circuitry's ability to match the modulator's RF response over the information signals bandwidth.

Figure 3:
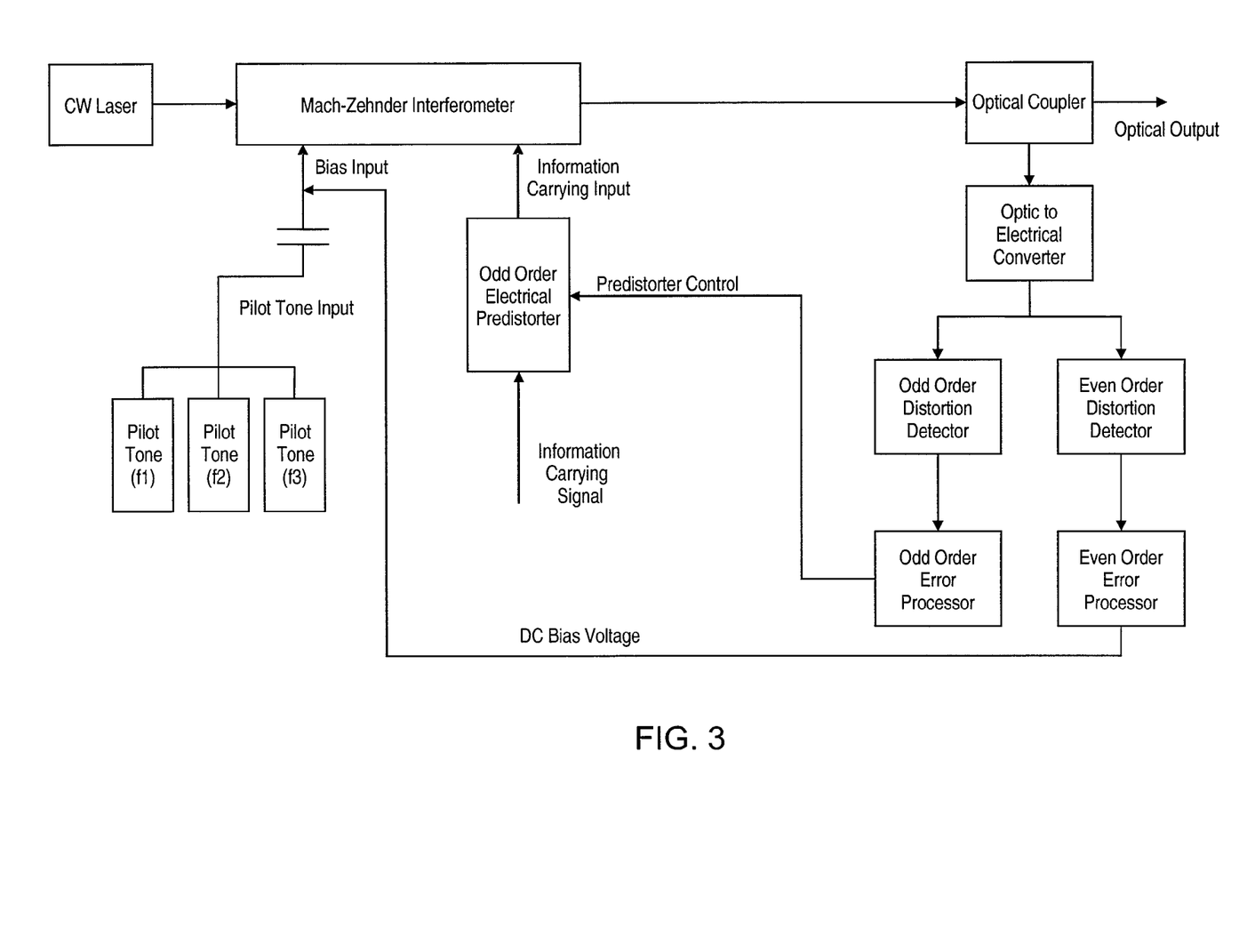
FIG. 3 is a simplified block diagram of a control system suitable to minimize even and odd order distortions in an externally modulated optical transmitter comprising a single-stage MZI.

FIG. 3 shows a typical closed loop control system suitable to adaptively maintain even and odd order distortion reduction. Three pilot tones at frequencies $f_1$, $f_2$ and $f_3$ are applied to an MZI modulator trough the informational carrying input port or through the DC bias input port, so that the optical signal output from the modulator contains the applied pilot tones and their resultant non-linear products. An optical coupler samples the optical output signal, by splitting a portion of the signal, which is then detected by an optical to electrical converter, such as a photodetector. The signal sample is analyzed for even and odd distortion products induced upon the pilot tone frequencies and the produced error signals are used to control the DC bias point of the modulator in order to reduce even order distortions and the amplitude and phase of the electrical predistorter in order to reduce odd order distortions.

In an attempt to improve the accuracy of the correction of the system non linearity, the inventor has considered to increase the amplitude of the pilot tones in order to increase the level of the produced error signal. However, the inventor has understood that increasing the amplitude of the pilot tones has undesirable effects on the information carrying signal. The added pilot tone signals will non-linearly combine with the information carrying signal, thereby generating additional undesirable spurious distortion products that degrade the spectral fidelity of the transmitted information carrying signal.

Another possible detrimental effect of adding large pilot tones to the information carrying signal is the reduction in the amount of optical modulation index (OMI) available. The reduction of available OMI combined with the inherent electrical system and optic transmission noise contributions to the signal can reduce the signal to noise ratios (SNR) of the system.

U.S. Pat. No. 6,392,779 discloses a bias control system for automatically controlling a bias point of an electro-optical modulator, the system including a pilot tone generator that generates a first pilot tone at a first frequency and a second pilot tone at a second frequency. The first and second tones are swept in frequency over a predetermined frequency range with a predetermined sweep rate, to spectrally spread third order distortion products over a larger frequency band, allowing the amplitude of the pilot tones to be increased and thereby increasing the gain of the bias control circuit.

Figure 4A:
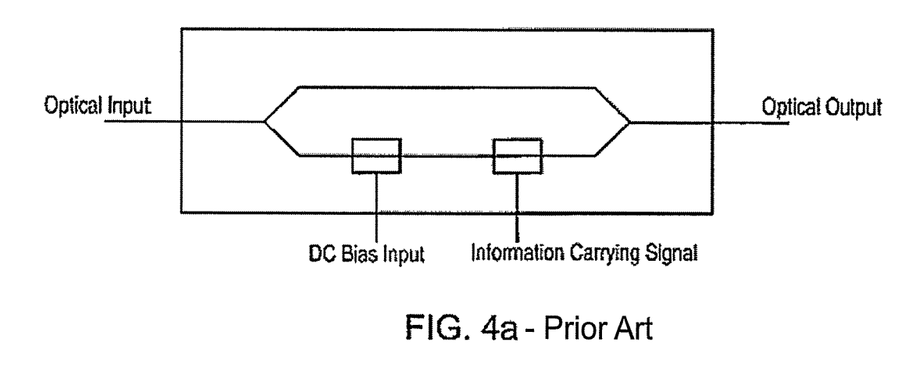
FIG. 4a is a simplified diagram of a single-stage MZI.
Figure 4B:
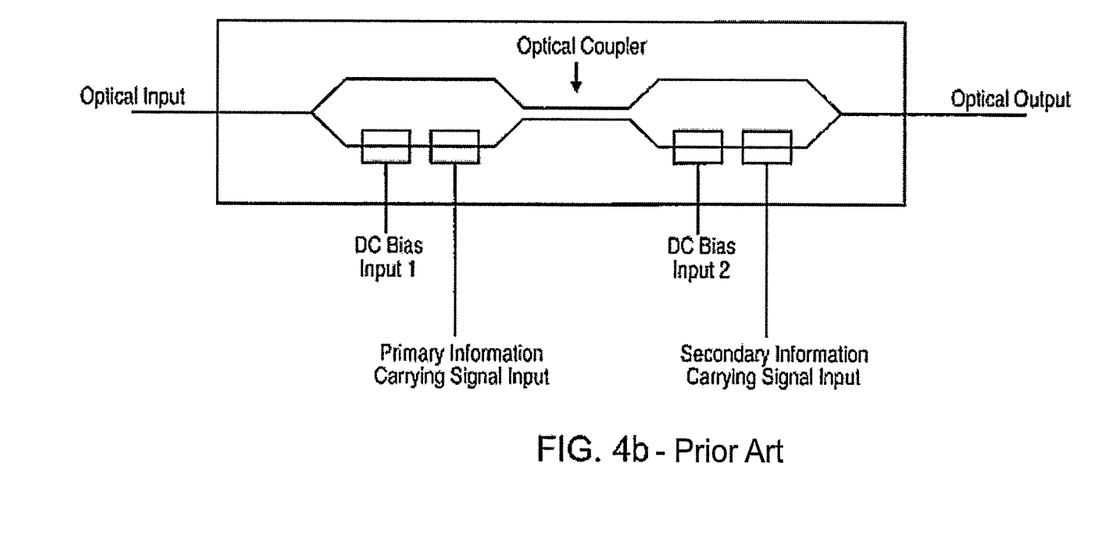
FIG. 4b is a simplified diagram of a series connected optically linearized modulator (OLM).

An alternative electro-optic modulator topology aimed to improve the linearity performance are the so-called optically linearized modulators (OLMs), which typically comprise two Mach-Zehnder interferometers connected in either a series or a parallel configuration by using an optical coupler. A simplified diagram of a single-stage MZI modulator and a simplified diagram of a series-connected optically linearized modulator (OLM) are shown in FIGS. 4a and 4b, respectively. The basic operation of an OLM can be simply described as a primary MZI modulator optically coupled to a secondary MZI modulator by means of an optical coupler, wherein the secondary MZI is especially designed to substantially cancel the odd order distortion created by the primary MZI. The use of an OLM has the advantage that odd order distortion cancellation occurs in the optical domain and thus its performance is inherently broadband.

However, the inventor has noted that the OLM requires that the two MZI sections within the OLM are simultaneously driven with the same information carrying signal at a given amplitude, phase, and electrical delay for realization of the optical linearization. In addition, each modulator section should be biased independently and at quadrature, to minimize odd order distortions. Therefore, the use of an OLM for external modulation generally require a significantly more complex closed loop control system to achieve an improved performance.

A non-ideal DC bias point setting in the primary MZI could be in principle easily compensated by a corresponding non-ideal DC bias point in the secondary MZI section. The inventor has noted that, although there may be an infinite number of DC bias voltage input combinations that result in a minimized even order distortion solution at the output of the OLM, there exists basically only one solution that results in a minimized odd order distortion output occurs when each individual modulator is correctly biased at its quadrature operating point. Furthermore, the DC bias points of the modulators may vary due to optical wavelength sensitivities, temperature variations, internal piezoelectric electrostatic charge accumulation and long term aging effects of the optical waveguides.

SUMMARY

In some aspects, the present invention provides an externally-modulated optical transmitter based on optically linearized modulators (OLMs) with improved performance and stability.

In some aspects, the present invention provides an externally modulated optical transmitter comprising an OLM, which allows for a minimization of even-order distortions in the output optical signal.

In some aspects, the present invention provides an externally-modulated optical transmitter comprising an OLM, in which a correct bias of each MZI at quadrature operating point can be achieved and maintained, even in the presence of mechanical and temperature variations across the OLM substrate and/or in the presence of variations in the electro-optic interactions between the two MZI sections.

In some embodiments, the solution allows for linearization and control of both odd and even order distortions generated in OLMs.

In some aspects, and in general terms, the present invention provides an optical transmitter for generating a modulated optical signal to be transmitted over a fiber optical link, the transmitter comprising: an optical source for producing an optical signal; an external modulator for modulating the optical signal produced by the optical source with an information-carrying signal, the external modulator comprising a first input port for receiving a first DC bias signal, a second input port for receiving a second DC bias signal; a pilot tone generator for generating a first pilot signal to be applied to the first input port and a second pilot signal to be applied to the second input port, the first and second pilot signals being capable of producing distortion products in the modulated optical signal, wherein a differential modulation signal is imposed onto either the first pilot signal or the second pilot signal so as to generate a first control signal that alternately adjusts the first DC bias signal and the second DC bias signal in order to minimize the distortion products.

Details of the present invention will now be described with reference to the accompanying drawings, in which some, but not all embodiments of the invention are shown. In the drawings and the following description, like reference numbers are used to identify like or functionally similar elements, and are intended to illustrate major features of exemplary embodiments in a highly simplified diagrammatic manner.

DETAILED DESCRIPTION

Figure 5:
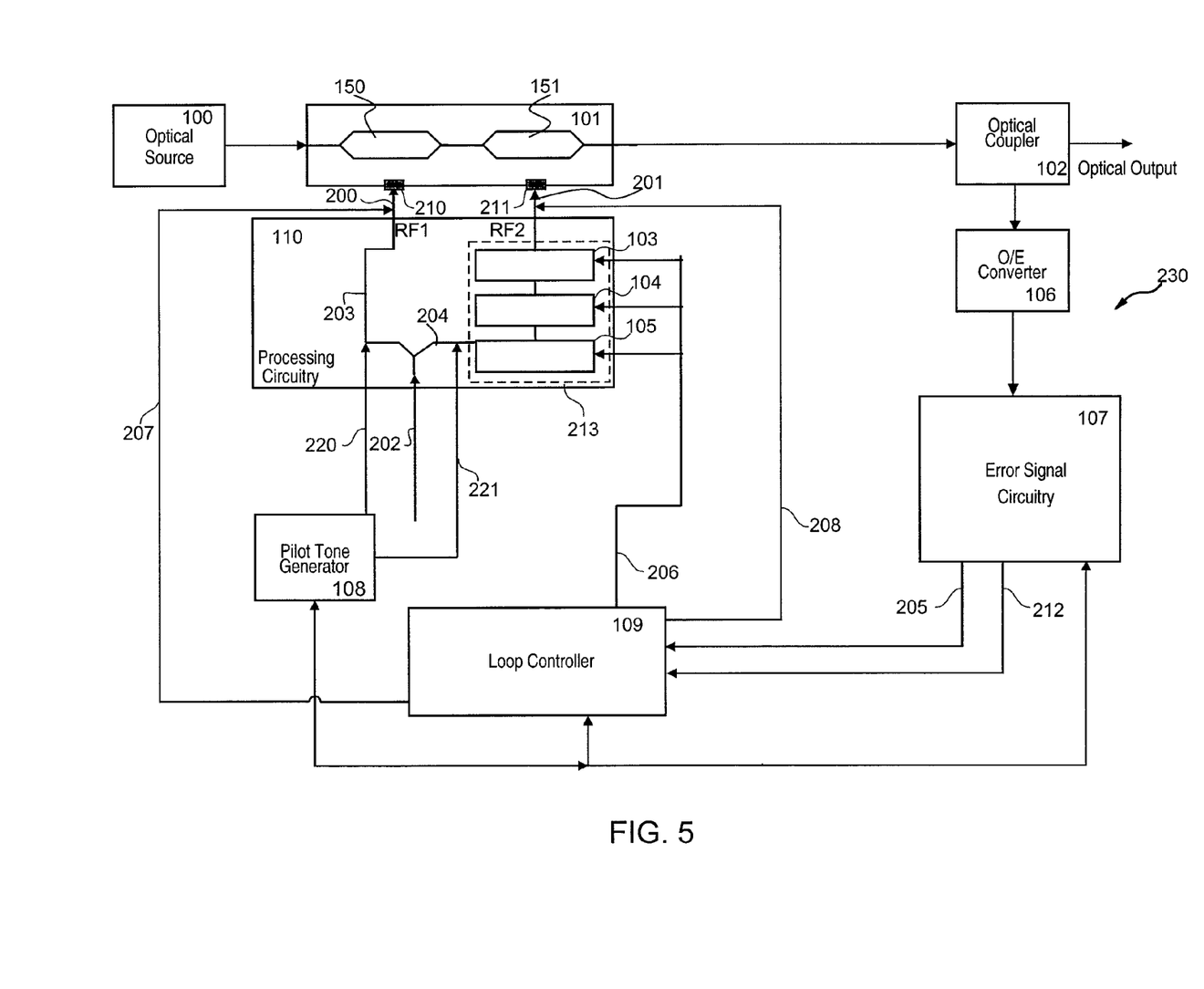
FIG. 5 is a simplified block diagram of a control system suitable for optimization of odd and even distortion linearization of an optically linearized external modulator, in accordance with some embodiments of the present invention.

FIG. 5 illustrates a functional block diagram of an optical transmitter for generating a modulated optical signal for transmission along an optical link, according to some embodiments of the present invention.

Optical transmitter 230 employs an external electro-optical modulator 101, which is optically coupled to an optical source 100, such as a semiconductor laser diode, for example a DFB laser diode, emitting a continuous wave (CW) optical signal. Alternatively, the optical source can be a fiber laser, a gas laser or in general an optical source of coherent light. The output optical signal of the modulator is optically coupled to a fiber optic transmission link (not shown in the figure).

In some embodiments, the external modulator 101 is a two-stage cascaded Mach-Zehnder (MZ) modulator employed for the linear external modulation of the CW output signal from optical source 100 and it is herein referred to as optically linearized modulator (OLM). The OLM comprises a primary MZ interferometer 150 and a secondary MZ interferometer 151, which receive a respective information-containing radio frequency (RF) signal 200 (RF1) and 201 (RF2) from respective input ports 210 and 211. Both primary and secondary MZ interferometers are biased with a DC bias voltage in order to maintain the individual interferometers at their ideal quadrature operating points. For example, commercially available OLMs can be employed, for which the values of amplitude, phase and delay levels of the signal applied to the input port of the secondary interferometer are specified in relation with the signal applied to the input port of the primary interferometer in order to achieve odd order linearization.

In some embodiments, the two interferometers are fabricated on a single substrate of $LiNbO_3$ to minimize thermal and mechanical stress variations.

In some embodiments, the primary interferometer 150 receives from input port 210 both the respective RF signal 200 and the DC bias signal 207 and the secondary interferometer 151 receives from input port 211 both the RF signal 201 and the DC bias signal 208. It is understood that the present invention encompasses the case of an OLM wherein each MZ interferometer is provided with two separate input ports for the information-carrying RF signal and the DC bias signal.

The optical transmitter 230 comprises a loop control system for dynamic linearization and control of even order distortion generated by the OLM and for control of odd order distortion. The loop control system makes use of two pilot signals (herein also referred to as pilot tones), each of the two signals to be injected into a respective input port of the OLM, namely a first pilot signal 220 to be injected into input port 210 of the primary interferometer 150 and a second pilot signal 221 to be injected into input port 211 of the secondary interferometer 151. As it will explained more in detail in the following, it is desirable that the pilot signals do not contain any significant spectral energy within the information-carrying bandwidth so that the modulated optical signal to be transmitted into the optical link remains uncorrupted.

The first and second pilot signals 220, 221 to be applied to the OLM 101 are generated by a pilot tone generator 108, which is apt to generate electrical signals across a plurality of spectral frequencies. The pilot tones 220, 221 are input to a processing circuitry 110 in which they are combined with the information-carrying signal 202 before entering the OLM 101. In particular, the information-carrying signal 202 is fed into the processing circuitry 110, where it is split into two circuit branches 203, 204 by means of a signal splitter (not shown in FIG. 5) having two output legs connected to two circuit branches. The first and second pilot signals are combined with information-carrying signal 202 in respective circuit branches 203 and 204.

The outputs of the processing circuitry 110 are AC-coupled to the OLM to allow a DC bias voltage to be applied to both input ports 210, 211 for even order distortion compensation.

While a suitable pilot tone generator could be constructed from discrete analog components, digital frequency synthesis techniques generally better fulfill the typical requirements for stable amplitude, phase, electrical delay, accurate modulation characteristics and relatively long operational lifetime, also in environmental extreme conditions. Preferably, the pilot tone generator is a digital frequency synthesizer capable of generating digital electrical signals with complex modulated and/or un-modulated waveforms. For example, the pilot generator is a direct digital synthesizer (DDS).

At the output of the OLM 101, an optical coupler 102 spills out a sample of the modulated optical beam containing the intermodulation products caused by the pilot tones. The sample of the optical beam is received by an optical-to-electrical (O/E) converter 106. Since the magnitude of the intermodulation product is indicative of the error between the optimal value of the DC bias voltages applied to the primary and secondary interferometers and the actual value of the DC bias voltages, as explained more in detail in the following, it is advantageous that the O/E converter is designed to faithfully recreate an electrical representation of the pilot tone intermodulation signals. In fact, any distortion generated by the O/E transformation may degrade the accuracy of the loop control system. Commercially available optical PIN diode receivers can provide sufficient performance, if properly designed. For example, a 2651 Broadband Photodiode commercialized by Emcore Corporation could be used for this purpose.

The electrical signal converted by the O/E converter 106 is fed into an error signal circuitry 107, which is capable of detecting and processing even order error signals and odd order error signal. In particular, the circuitry 107 contains a detection circuit block (not indicated in the figure) that is capable of selecting the portion of the frequency spectrum of the electrical signal received by the O/E converter including the frequencies of the pilot tones, i.e., capable of extracting the error signal while removing all spurious signals that may have been added to the modulation bandwidth by the OLM. In addition, the circuitry 107 includes a demodulator circuit block (not indicated in the figure) that is capable to coherently demodulate the selected error signal so as to produce a demodulated RF analog signal 205 containing information related to the even order distortion characteristics of the OLM.

Due to the fact that error signal components in the electrical signal output from the O/E converter inherently exhibit relatively low signal levels, a digital approach for detecting and processing the electrical signal in circuitry 107 may be better suited to improve detection sensitivity. In an embodiment, the output electrical signal provided by the O/E converter is converted into the digital domain by means of a high-speed analog to digital converter included in circuitry 107. The digitalized output electrical signal is then filtered and demodulated by respective detection and demodulation circuit blocks. The digital approach in general allows for the implementation of complex modulations which employ large frequency deviations, which yield lower pilot tone spurious emissions, and digital coding schemes, such as forward error correction (FEC) algorithms, which yield a relatively high detected signal to noise ratios. Commercially available microprocessors and digital signal processors can provide a wide range of high accuracy digital filtering, spectral analysis, and complex coherent demodulators improving temperature performance and accuracy.

It is to be understood that discrete analog detection and demodulation blocks, comprising e.g. analog mixers, synchronous detectors, analog phase shifters and amplifiers, may be employed in the circuitry 107 within the scope of the present invention.

The error signal circuitry 107 generates an even order error signal 205 that is fed into a distortion loop controller 109, which processes the error signals to be used as control signals for the adjustments of the DC bias signals to be input in the OLM.

Each of the two pilot tones 220, 221 contains at least two distinct RF pilot carriers at pilot frequencies, f1 and f2, for composite second order (CSO) correction. In some embodiments, each of the two pilot tones 220, 221 contains three distinct RF pilot carriers at pilot frequencies, f1, f2, and f3, for CSO correction and composite triple beat (CTB) correction, as more detailed in the following.

In some embodiments, two substantially identical signals are generated by the pilot tone generator 108, which are substantially equal in amplitude, phase and electrical delay, so that the nonlinear characteristics of the OLM affect the pilot tones in a way that correlates to the non-linearities induced upon the information-carrying signal. In particular, the two pilot signals are equal, or at least equal to the accuracy required by the information-carrying signal for proper distortion cancellation.

In the following, an exemplary embodiment in which the two pilot tones 220, 221 contain three distinct RF pilot carriers at pilot frequencies, f1, f2, and f3 is described. The frequencies are properly selected so as to produce, at the output of the OLM 101, even and odd distortion products to be detected. The amplitude of the sum and difference products of the pilot frequency pairs is indicative of the even order harmonics output by the OLM, whereas the amplitude of the sum or difference products of the three pilot frequencies is indicative of the odd order harmonics. The most significant intermodulation (or distortion) products of interest for even order products are f1+/−f2, f1+/−f3 and f2+/−f3, while and the odd order inter-modulation products comprise f1+/−f2+/−f3. Any of these intermodulation products may be used for loop control.

Although in principle the three frequencies can be somewhat arbitrarily selected, it is desired that the distortion products fall in an unused portion of the frequency bandwidth of the RF information-carrying signal.

According to a relevant feature of the present invention, one of the two pilot tone signals injected in the OLM contains a modulation signal that is used to solve the DC bias point duality problem inherent in OLMs. More specifically, a differential modulation signal is imposed on either the first pilot signal to be applied to the primary MZI or on the second pilot signal to be applied to the secondary MZI.

With no intention to limit the scope of the invention, in the embodiments described in the following, the differential modulation is imposed upon the second pilot signal to be applied to the secondary MZI. The differential modulation signal may be an amplitude-modulation (AM) signal, a frequency-modulation (FM) signal, a phase-modulation (PM) signal, or any combination of AM, FM or PM modulation signals. Waveform of the differential modulation may be arbitrary, in particular not necessarily periodic, as long as the demodulator circuit block 107 can process it, e.g., by having knowledge of the waveform.

The differential modulation signal can be generated by a digital pattern generator module included in the pilot tone generator 108 so as to output a second pilot signal 221 having a superimposed differential modulation signal. The differentially modulated second pilot signal 221 is fed into the processing circuitry 110.

Regardless of the pilot tone modulation technique or detection approach, coherent detection and modulation by the error signal circuitry 107 can provide both magnitude and phase information of the error signals.

According to some embodiments, each of the pilot signals at the pilot frequencies is modulated with a superimposed sweep modulation signal in order to spectrally spread the optical power produced by spurious intermodulation products, which may result from non-linear mixing of the pilot tones and the information carrying signal. The sweep modulation signal sweeps the pilot frequencies across a predetermined frequency sweep interval with a predetermined sweep rate. The sweep modulation signal may be an amplitude-modulation (AM) signal, a frequency-modulation (FM) signal, a phase-modulation (PM) signal, or any combination of AM, FM or PM modulation signals. Waveform of the sweep signal may be random.

In some embodiments, the sweep modulation signal is a digital modulation signal, which can be generated by a digital pattern generator that is included in the pilot tone generator. In some embodiments, each of the RF pilot carriers is swept in frequency with an identical digital signal.

In some embodiments, the frequency sweep interval ranges from 10 KHz to 6 MHz. In some embodiments, the sweep rate is larger than 10 kHz. In some embodiments, the sweep rate is not larger than 1 MHz.

In some embodiments, each of the first and second pilot tones are at predetermined pilot frequencies, which are swept in frequency with an identical sweep modulation signal, and the second pilot tone has a superimposed differential modulation signal.

Optimum input signals may vary with temperature, the applied optical wavelength, mechanical stresses and age of the OLM. Any variation in the passive and active components within the processing circuitry 110 will also need to be compensated for optimum performance.

In some embodiments, the error signal circuitry 107 detects and processes, besides the even order error signal, odd order intermodulation products output from the OLM. Information regarding the differential modulation may be used for coherent detection of the odd and even error signals, improving noise immunity and system operating dynamic range. The error signal circuitry 107 comprises a detection circuit block that is capable of selecting at least a portion of the frequency spectrum of the electrical signal received by the O/E converter including the frequencies of the pilot tones, i.e., capable of extracting the odd and even order error signal while removing all spurious signals that may have been added to the modulation bandwidth by the OLM. In addition, the circuitry 107 includes a demodulator circuit block that is capable to coherently demodulate the selected odd and even order error signal so as to produce demodulated RF analog signals 205 and 212 containing information related to the even and odd order distortion characteristics, respectively, of the OLM.

The odd order signal 212 is received by the loop controller 109, which processes it for compensation control of odd order distortion by transmitting the signal as an input to an adaptive compensation block 213 comprised in the input processing circuitry 110 and arranged in line with the circuit branch 204 so as to receive the RF signal (RF2) composed by the superposition of the second pilot signal 221 and the information-carrying signal 202. Alternatively or in addition, the adaptive compensation block 213 may be arranged to receive the RF signal (RF1) composed by the superposition of the first pilot signal 220 and the information-carrying signal 202 (not shown).

In some embodiments, for adaptive compensation for possible variations of OLM's characteristics and environmental fluctuations, the adaptive compensation block comprises an electronic variable attenuator 105, an electronic variable phase shifter 104 and an electronic variable delay line 103. The electronic controls for the three adjustments originate from the loop controller 109.

To simplify the following detailed description, the case where the differential modulation on the second pilot signal 221 takes the form of a low-frequency AM digital signal, for example at a frequency of less than 1 Hz and with modulation depth of 33%. In some embodiments, the modulation amplitude of the differential signal is selected so that the second pilot signal 221 exhibits an amplitude variation in time from a value equal to the amplitude of the first pilot signal 220 to a value slightly below (or slightly above) the amplitude of first pilot tone signal 220. In some embodiments, the difference between the value of amplitude of the first pilot signal and the value of amplitude distinct from that of the first pilot signal is less than 25%, for example equal to 2 dB.

In general, it is noted that the imposed AM differential modulation has a relatively small modulation depth as the amplitude imbalance between the primary and secondary interferometer inputs may cause non-ideal odd order cancellation in the OLM, which in turn may result in non-ideal spurious mixing products in the bandwidth of the information-carrying signal.

In the following, operation of the distortion control system for linearization of the OLM, according to some embodiments of the present invention, is described.

A first and second pilot signal 220, 221 are applied to the primary and secondary interferometer, respectively, as described above. A sweep modulation signal is superimposed to each of the two pilot signals 220, 221. In an embodiment, an identical FM digital modulation signal having sweep rate of 30 kHz and sweep frequency interval of 100 kHz is superimposed to each pilot signal.

In addition, a differential modulation signal is superimposed to the second pilot signal 221. In some embodiments, an AM signal is employed as differential modulation signal. The amplitude of the modulation is selected so that in correspondence with an half cycle of the differential modulation signal, the pilot signal 221 is attenuated with respect to the first pilot signal 220, whereas in the subsequent half cycle the two pilot signals have a substantially equal amplitude.

The primary and secondary DC bias voltages are set to an initial value, which can be the same for both bias voltages, by the distortion loop controller 109. The initial value of the bias voltages can be arbitrarily selected, for instance equal to 0 volts. The OLM 101 modulates the initial input signals onto the output of the optical light source 100 and the resultant output modulated optical signal is sampled by the optical coupler 102. The sampled optical signal is re-converted back to the electrical domain in the O/E converter 106, thereby resulting in an output electrical signal that contains replicas of the information carrying signal 202, both the primary and secondary pilot signals 220, 221, and the even order distortion products caused by the nonlinear response of the OLM when biased with non-ideal DC biased voltages. In other words, due to the fact that the two interferometers within the OLM are not initially biased at quadrature, the presence of significant even order distortion products at predictable error frequencies is expected.

The output electrical signal is fed into the error signal circuitry 107 that includes a detection circuit block apt to remove all spectral components present in the electrical signal output from the O/E converter 106 except the products related to the even order distortions of the pilot frequencies. The demodulation circuit block of circuitry 107 coherently demodulates one or more even order distortion products. As discussed above, any even order distortion product can be selected for demodulation. However, only to simplify the following description, in the present case it will be assumed that the desired even order product occurs at the (f1-f2) frequency.

The signal at even order frequency (f1-f2) is then filtered and coherently demodulated by the error signal circuitry 107. The coherent demodulation removes the FM sweep modulation applied to the pilot tones for spectral spreading, and provides time-varying samples of the magnitude and phase of the even order error signal (f1-f2).

The time-varying samples sent to the loop controller 109, which is a digital loop controller in this embodiment, are synchronized with the differential AM modulation being superimposed on the secondary interferometer's input 211. The digital control loop's operation is iterative due to the fact that the correct quadrature bias point on each interferometer within the OLM is loosely dependent on each other. This is due to the loose coupling that typically exists between the two MZI's within the OLM, thereby making DC bias points between the interferometers dependent on each other. In general, proper DC biasing for minimum even order products can only be achieved after a number of successive error measurement and DC bias adjustment cycles.

Figure 7:
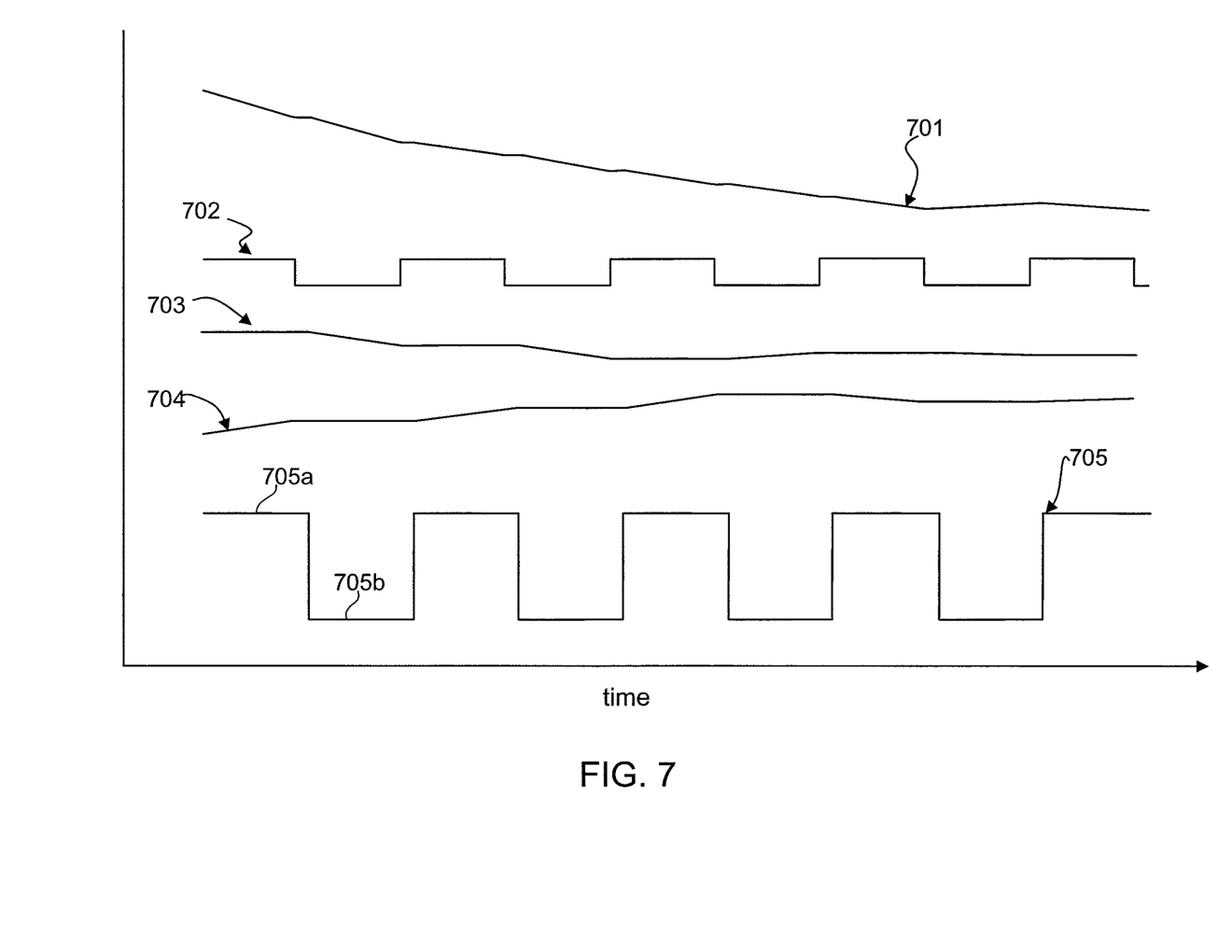
FIG. 7 is a simplified exemplary state diagram of a control algorithms control and error signals.

FIG. 7 illustrates an example of the even order distortion control loop's operation as a function of time.

The minimum error point is attained, by the digital loop controller 109, by monitoring the magnitude 701 and phase 702 of the even order error signal output from the error signal circuitry 107 (indicated with referral number 205 in FIG. 5).

Curve 703 represents the DC bias signal of the primary interferometer, while curve 704 represents the DC bias signal of the secondary interferometer. The differential modulation signal 705 to be applied to the second pilot signal is an AM signal approaching a square waveform. The amplitude of the modulation is selected so that in the positive half cycle 705a of the differential modulation signal 705, the pilot signal 221 is attenuated with respect to the first pilot signal 220, whereas in the negative half cycle 705b the two pilot signals have a substantially equal amplitude. It is to be understood that the selection of a positive half-cycle for attenuation of the second pilot tone is arbitrary and any amplitude modulation can be selected as long as the second pilot tone is attenuated in half-cycle of the modulation signal, whereas it is substantially unaffected in the subsequent half cycle.

The control loop algorithm begins when the second pilot signal 204 is attenuated in amplitude in respect to the first pilot signal 203 by the differential modulation signal (corresponding to the half cycle 705a of the differential modulation of FIG. 7). The attenuation of the second pilot signal causes the detected even order error signal to be predominately generated by the primary interferometer 150. The digital control loop controller 109 maintains a constant DC bias signal 703 of the secondary interferometer (indicated with 208 in FIG. 5) and adjusts the DC bias signal 704 of the primary interferometer (indicated with 207 in FIG. 5) until the detected even order error signal is minimized. The phase of the even-order signal 702 is modulated in time as the differential modulation signal 705 and takes minimum values in correspondence with the half-cycles of the differential signal not affecting the second pilot tone.

During the subsequent half cycle 705b of the differential AM modulation 705, the first and second pilot signals amplitudes are equal. The digital loop controller 109 minimizes the even order error signal's magnitude 701 by adjusting the DC bias signal 703 of the secondary interferometer while keeping the DC bias signal 704 of the primary interferometer constant at the level determined in the last half cycle. The error signal in this half cycle of the differential AM modulation 705 is representative of the actual even order performance of the OLM.

The algorithm is an iterative algorithm that continues through the differential modulation cycles until an optimized solution is reached, where both primary and secondary interferometers within the OLM are correctly biased at their quadrature points.

In some embodiments, the control loop is active during operation of the optical transmitter and in particular the algorithm of the control loop continues to alternate the adjustment of the two DC bias signals in order to track any changes in the quadrature bias points, for instance caused by environmental changes or by performance variations of the OLM, e.g., due to aging.

The curve 701 of the magnitude of the even order error signal is a simplified diagram of the even order loops convergence towards the ideal solution, which corresponds to the minimization of the magnitude signal.

While the above description details the case where the differential modulation is an AM signal, it is to be understood that other modulation functions, such as FM or PM, could be used for the differential modulation.

From a general viewpoint, any type of differential modulation that can resolve the even order distortion performance of the primary interferometer from the secondary interferometer could be employed within the scope of the present invention.

In some embodiments, the first pilot signal to be applied to the primary interferometer is comprised of multiple CW carriers that are phase modulated with a first pseudo-random digital sequence, while the second pilot signal to be applied to the secondary interferometer contains the same multiple CW carriers of the first pilot signal, being phase modulated by a distinctly different pseudo-random digital sequence. Generally speaking, the difference between the two pilot signals should be sufficient for the control loop to resolve the algorithm, but not too pronounced to cause undesirable spurious distortions.

Since all demodulation is coherent and the pilot tone generator has knowledge of the two pseudo-random sequences used, a digital demodulator could be implemented to demodulate the even order distortion products caused by the secondary interferometer and the composite even order distortion products caused by both modulators. These two demodulated even order error signals could be used to implement the same locking algorithm described above. Such a demodulation implementation may be very similar to those used in current code division multiplexed communication systems.

In some embodiments, a feedback loop control for odd order adaptive compensation is carried out. The odd order distortion feedback control loop implemented by loop controller 109 can employ the same hardware as the even order loop described above. However, minimum odd order distortion performance of the OLM can only be determined while the spectral content of the pilot tones applied to both the secondary and primary interferometers 150, 151 are exactly equal. This requirement makes necessary to have the differential modulation, which is employed for the even order control loop, inactive while the odd order control loop is functioning.

When an AM signal is used as differential modulation, the two pilot tones have the same characteristics, and in particular the same amplitude, in the time periods in correspondence with the half cycles not affecting the amplitude of the second pilot tone signal. Within the time periods in which the pilot tones are equal, it is possible to implement an odd order control loop simultaneously with the even order control loop.

When other modulations are used in the differential modulation signal, such as FM or PM, the even order control loop functions need to be suspended during odd order loop operation. As significant variations in OLM performance are known to change slowly over time, interruption of the even order control loop is nor expected to significantly degrade the performance of the optical transmitter. For example, assuming a constant temperature, the even order control loop functions are suspended for a few minutes.

In some embodiments, for odd order control loop case, two identical pilot tone signals comprising multiple RF carriers that are both identically modulated for spectral spreading, are applied to the processing circuitry 110 at circuit branches 203 and 204. The first pilot signal is passed directly to the primary modulator input 200 and the second pilot signal is passed through the adaptive compensation block 213 comprising a programmable amplitude 105 control circuitry, a phase control circuitry 104 and an electrical delay control circuitry 103. As described above, the pilot signals are modulated onto the optical carrier and a sample of the OLM's output optical signal is converted back into the electrical domain by O/E converter 106 and fed into the error signal circuitry 107, which processes both the even order and the odd order distortion products of the input electrical signal.

Odd order distortion products of interest are f1+/−f2+/−f3, where f1, f2, f3 are the three pilot tone carrier frequencies of the pilot signals. Although there are additional odd order products that occur at 2(f1)+/−f2, 2(f2)+/−f3 . . . etc., the magnitude of these products are typically −6 dB lower than that of the distortion product f1+/−f2+/−f3. An appropriate odd order distortion product is selected by the detection circuit block and demodulated by the demodulation circuit block of circuitry 107. Again, the sweep modulation is removed form the detected signal, and magnitude and phase error signals are sent to the digital loop controller 109.

Optimum odd order linearization of the OLM occurs at a specific ratios of amplitude, phase and delay between the primary and secondary ports of the OLM.

Through successive adjustments of the odd order compensation control signals 206, a minimum odd order error level is attained. This closed loop control of the parameters for optimum OLM performance ensures consistently superior odd order distortion performance when compared to a passive or static adjustment of these parameters. Implementation of this control system has been found to suitably compensate for environmental and age related variations of the OLM characteristics.

It is to be understood that, in the adaptive compensation block 213, up to two of the three possible adjustments, delay 103, phase 104, and amplitude 105 may be removed from the control loop. In other words, the odd order control loop can make use of adjustments of only one of the three parameters or of only two parameters.

The OLM structure is a combination of Mach-Zehnder interferometers and optical couplers, which generally require to exhibit precise amplitude, phase and optical coupling characteristics. Currently available manufacturing techniques, such as those for OLM structures based on $LiNO_3$, may limit the amount of odd order linearization that can be reproducibly realized.

In some embodiments of this invention, electrical predistortion techniques are applied to the OLM to further improve the system performance without degrading the inherent optical linearization characteristics.

Figure 6:
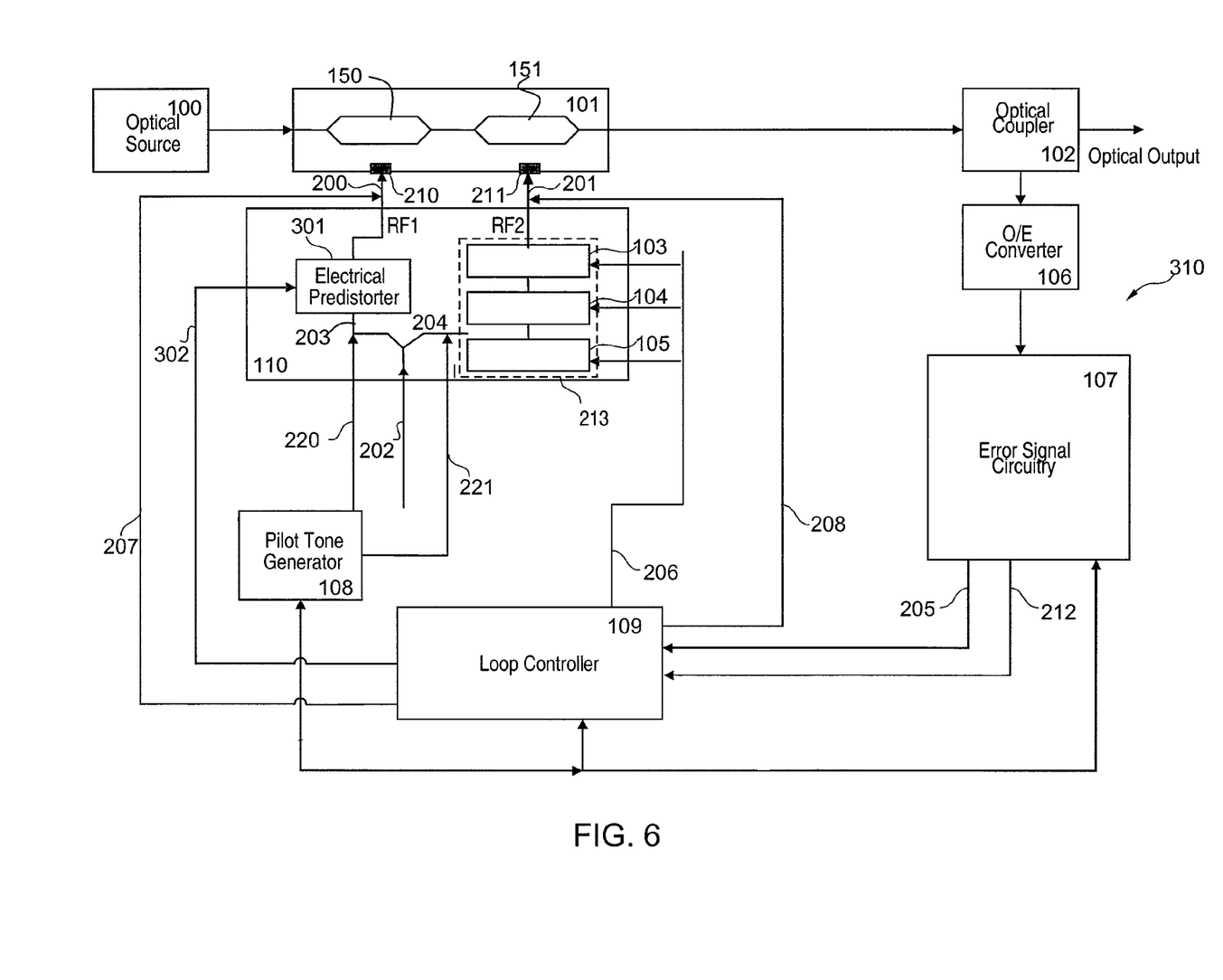
FIG. 6 is a simplified block diagram of a control system suitable for optimization of odd and even distortion linearization of an optically linearized external modulator, enhanced by the addition of electrical predistortion, in accordance with some embodiments of the present invention.

FIG. 6 a simplified block diagram illustrating some embodiments of the present invention. The optical transmitter 310 comprises an odd order electrical predistorter 301 placed in series with the first RF signal 200 (input port 210) to further enhance minimization of odd order distortion. Alternatively or in addition, the odd order electrical predistorter 301 may be placed in series (not shown) with the second RF signal 201 (input port 211). The electrical predistorter receives an electronic pre-distortion control signal 302 from the loop controller 109.

The electrical predistorter 301 is properly designed and biased to generate odd order distortion products that are equal in amplitude and opposite in phase with any residual odd order distortion products still present after the digital control loop has reached its optimum convergence point. The control loop's algorithm can comprise control and optimization of the odd order distortions by controlling the electrical predistorter by means of the loop controller 109, which receives the odd order error signals from circuitry 107 and adjusts the pre-distortion control signal 302 to be input in the electrical predistorter 301.

The invention claimed is:

1. An optical transmitter for generating a modulated optical signal to be transmitted over a fiber optical link, the transmitter comprising:
   an optical source for producing an optical signal;
   an external modulator for modulating the optical signal with an information carrying signal, the external modulator comprising a first input port for receiving a first DC bias signal, and a second input port for receiving a second DC bias signal; and
   a pilot tone generator for generating a first pilot signal to be applied to the first input port and a second pilot signal to be applied to the second input port, the first and second pilot signals being capable of producing distortion products in the modulated optical signal, wherein a differential modulation signal is imposed onto either the first pilot signal or the second pilot signal so as to generate a first control signal that alternately adjusts the first DC bias signal and the second DC bias signal in order to minimize the distortion products.

2. The transmitter of claim 1, wherein the first pilot signal and the second pilot signal are combined with the information carrying signal before being injected into the external modulator so as to generate a first and second RF signal to be injected into the first and second input port, respectively, wherein the external modulator is a two-stage modulator.

3. The transmitter according to claim 2, further comprising an adaptive compensation block arranged to receive either the first RF signal or the second RF signal before being injected into the respective first or second input port, wherein the adaptive compensation block comprises at least one of the group consisting of a variable attenuator for amplitude compensation, a variable phase shifter for phase compensation, and a variable delay line for electrical delay compensation.

4. The transmitter of claim 1, wherein the first and the second pilot signals are substantially identical and wherein the differential modulation signal imposed onto either the first pilot signal or the second pilot signal alternately change either the first pilot signal with respect to the second pilot signal or the second pilot signal with respect to the first pilot signal.

5. The transmitter of claim 4, wherein the differential modulation signal is an amplitude modulation signal.

6. The transmitter of claim 1, wherein the first and the second pilot signals are substantially identical and characterized by a first value of amplitude and the differential modulation signal is an amplitude modulation signal that changes periodically between the first value of amplitude and a second value of amplitude, the second value of amplitude being smaller or larger than the first value of amplitude.

7. The transmitter of claim 6, wherein the second value of amplitude is up to 25% smaller or larger than the first value of amplitude.

8. The transmitter according to claim 1, wherein the pilot tone generator is a direct digital synthesizer.

9. The transmitter of claim 1, further comprising:
an optical coupler for extracting a sample of the modulated optical signal received from the external modulator;
an optical to electrical converter for converting said optical sample into an electrical signal; and
an error signal circuitry for processing said electrical signal to detect even order distortion products and generate an even order error signal to be used as first control signal.

10. The transmitter of claim 9, further comprising:
a loop controller arranged to receive the even order error signal output from the error signal circuitry, the loop controller being apt to generate the first and second DC bias signals based on the received even order error signal.

11. The transmitter of claim 9, wherein the error signal circuitry is apt to process said electrical signal to detect odd order distortion products and generate an odd order error signal to be used as a second control signal.

12. The transmitter of claim 9, further comprising
a loop controller arranged to receive the even order and odd order error signal output from the error signal circuitry, the loop controller being apt to generate the first and second DC bias signals based on the received even order error signal and a second control signal for controlling an adaptive compensation arranged to receive either the first RF signal or the second RF signal before being injected into the respective first or second input port.

13. The transmitter according to claim 1, further comprising an odd order electrical predistorter arranged in series either with the first input port or with the second input port.

14. The transmitter according to claim 1, wherein the information carrying signal is in a information frequency bandwidth and wherein the first and second pilot signals are at a range of frequencies selected so that the distortion products fall outside the information frequency bandwidth.

15. The transmitter of claim 1, wherein the external modulator is an optically linearized electro-optic two-stage modulator including a primary and a secondary Mach-Zehnder interferometers, the first input port being connected with the primary interferometer and the second input port being connected with the secondary interferometer.

16. The transmitter of claim 1, wherein the first and second pilot signals are at a range of frequencies containing at least two distinct RF carrier frequencies (f1, f2).

17. The transmitter of claim 1, wherein the first and second pilot signals are at a range of frequencies containing at least three distinct RF carrier frequencies (f1, f2, f3).

18. The transmitter of claim 1, wherein the first and second pilot signals are modulated with a sweep modulation signal having a predetermined sweep interval and a predetermined sweep rate.

19. The transmitter of claim 18, wherein the sweep modulation signal is selected from the group comprising an amplitude modulation signal, a frequency modulation signal, phase modulation signal, or any combination thereof.

20. The transmitter of claim 18, wherein the predetermined sweep interval ranges from 10 kHz to 6 MHz and the predetermined sweep rate ranges from 10 kHz to 1 MHz.

21. The transmitter of claim 1, wherein the first and second pilot signals are at a range of frequencies containing three distinct RF carrier frequencies (f1, f2, f3) and each of the three carrier frequencies is swept in frequency by a sweep modulation signal having a predetermined sweep interval and a predetermined sweep rate.

* * * * *